(No Model.) 5 Sheets—Sheet 1.

W. WEST.
MACHINE FOR MOLDING FLOWER POTS, &c.

No. 507,053. Patented Oct. 17, 1893.

Witnesses:
G. W. Rea
Robert Everitt

Inventor:
William West
By James L. Norris
Atty.

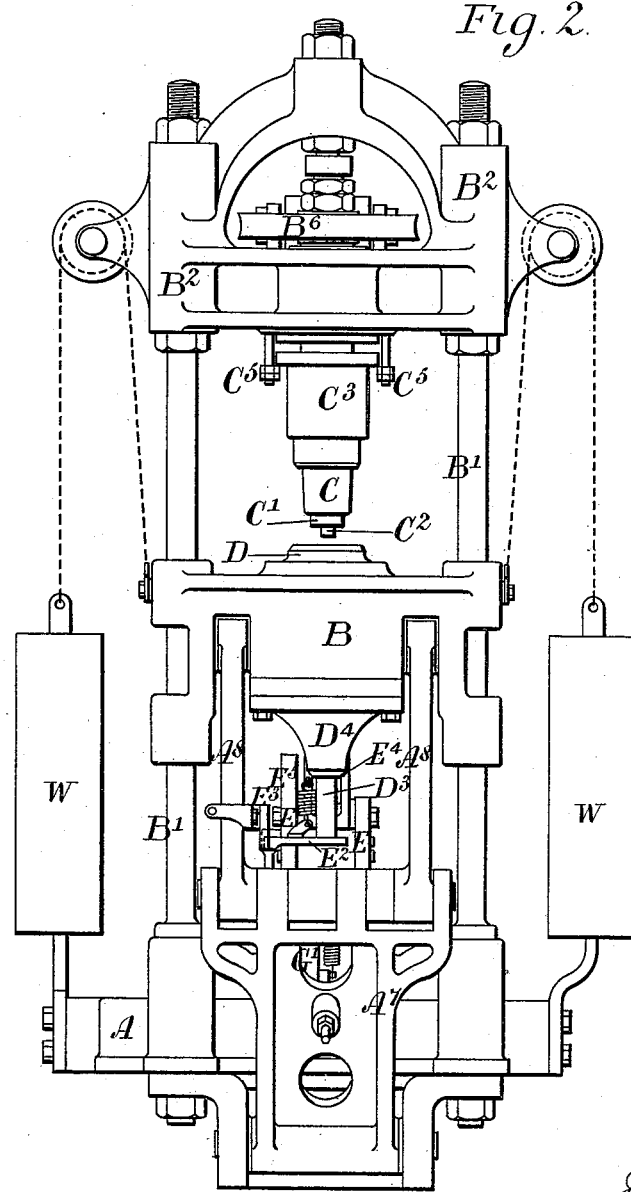

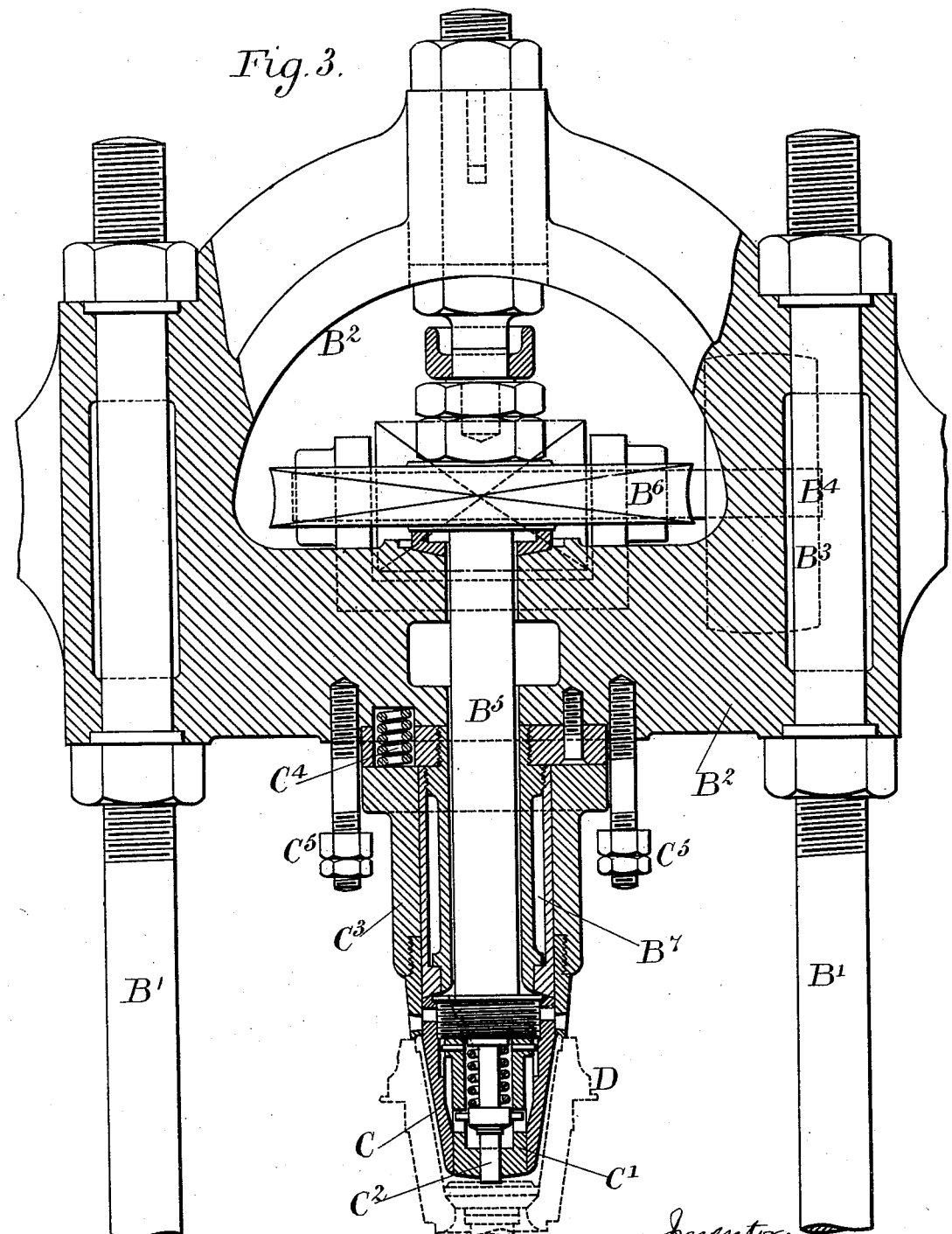

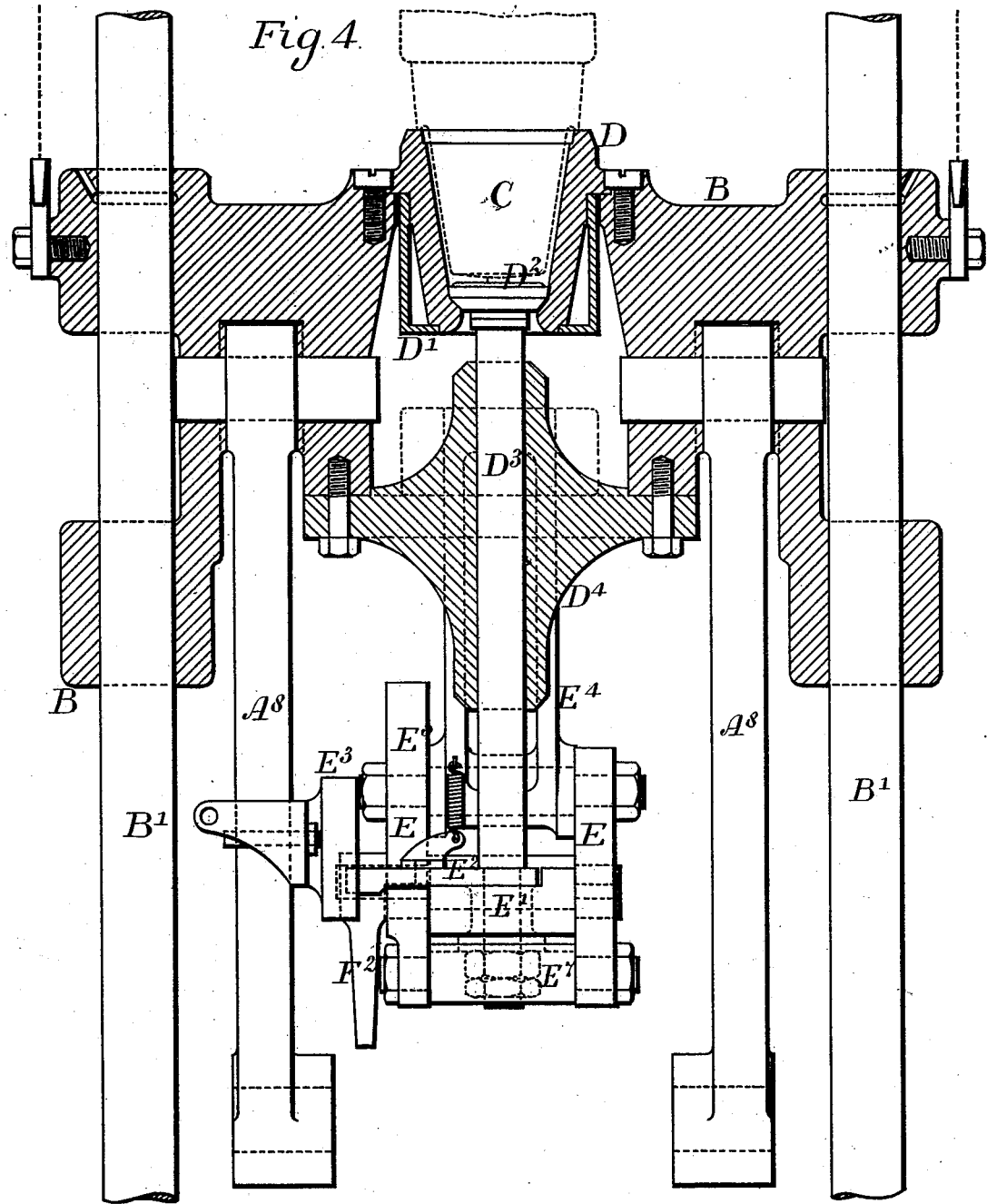

(No Model.)  5 Sheets—Sheet 5.

W. WEST.
MACHINE FOR MOLDING FLOWER POTS, &c.

No. 507,053. Patented Oct. 17, 1893.

Witnesses:  Inventor:
William West
By James L. Norris
Atty.

UNITED STATES PATENT OFFICE.

WILLIAM WEST, OF LEEDS, ENGLAND.

MACHINE FOR MOLDING FLOWER-POTS, &c.

SPECIFICATION forming part of Letters Patent No. 507,053, dated October 17, 1893.

Application filed March 9, 1893. Serial No. 465,322. (No model.)

*To all whom it may concern:*

Be it known that I, WILLIAM WEST, tailor, a citizen of England, residing at Roseville, Roundhay, Leeds, in the county of York, England, have invented a certain new and useful Apparatus for Molding Flower and other Pots, Saucers, Pans, and other Ceramic or Earthenware Articles, of which the following is a specification.

My invention relates to apparatus for molding ceramic or earthenware articles such as flower and other pots, saucers, pans and articles generally that can be pressed between a mold and core or a punch and die, as I shall describe referring to the accompanying drawings.

Figure 1:
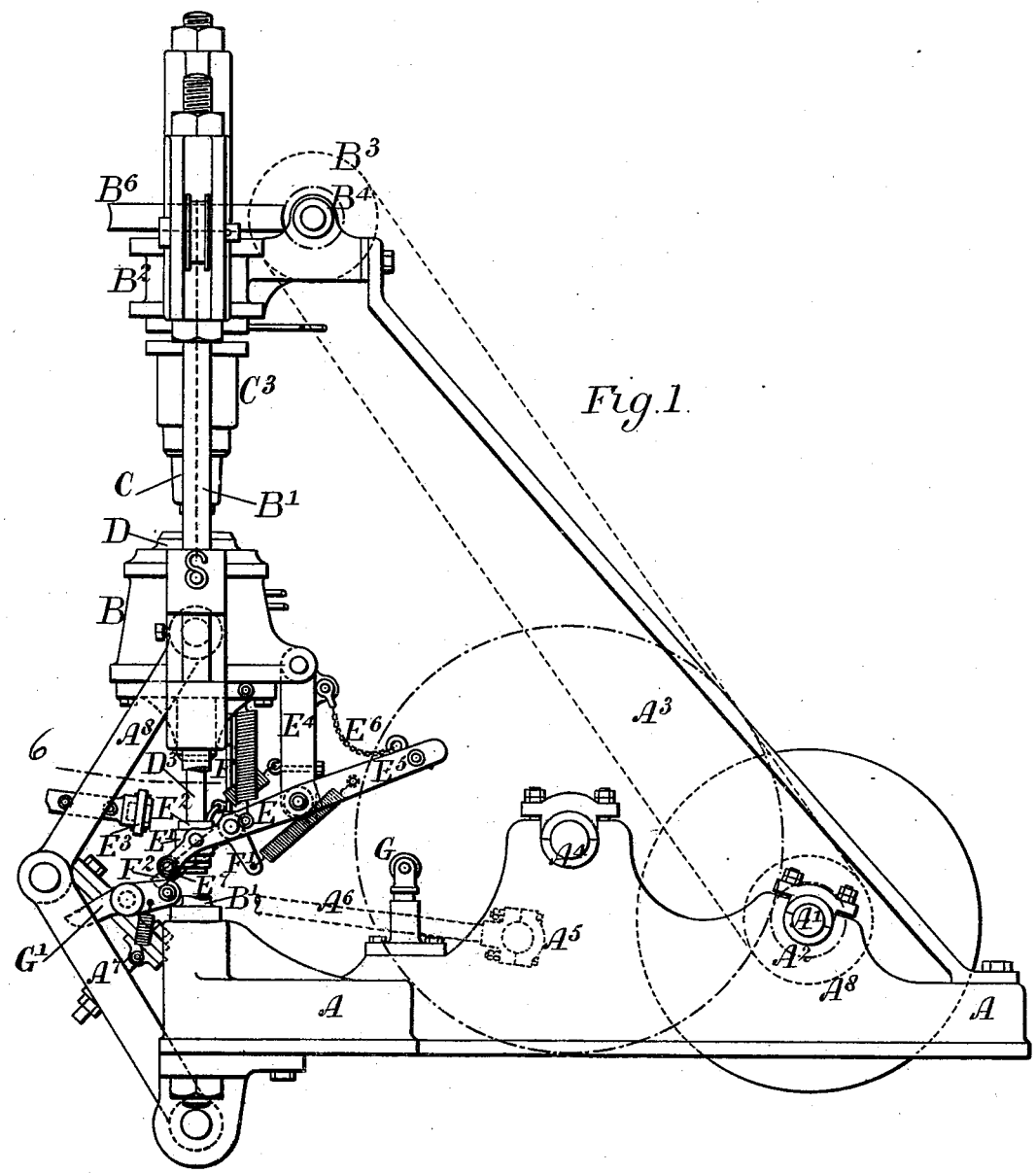
Figure 6:
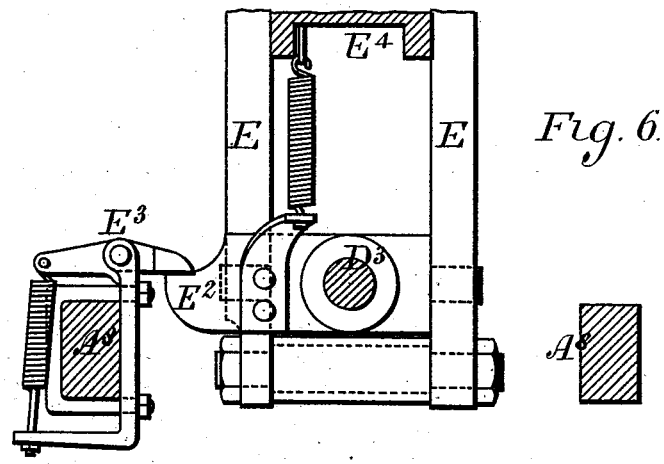
Figure 5:
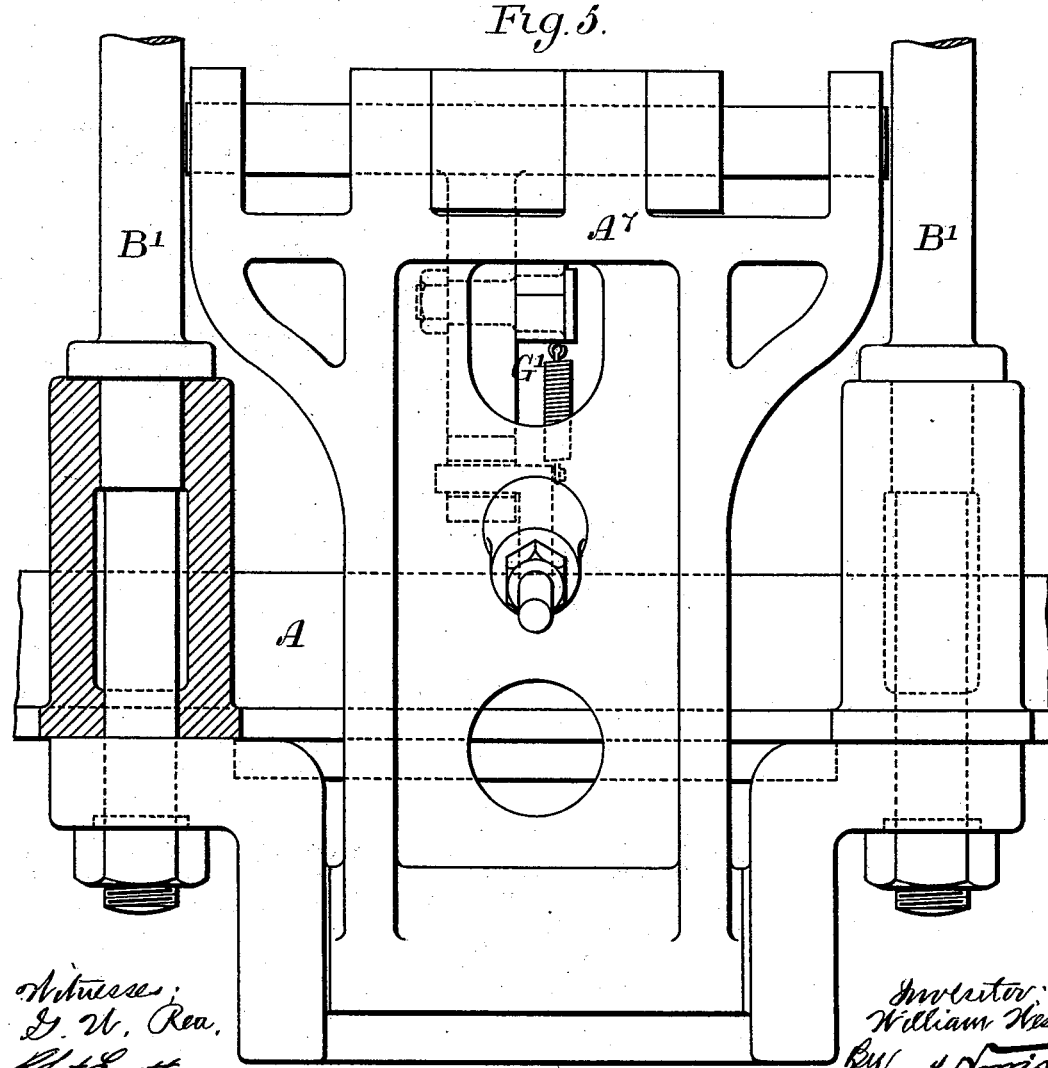

Figure 1 is a side view and Fig. 2 is a front view of a machine according to my invention adapted for molding flower pots. The other figures drawn to an enlarged scale to show details are:—Fig. 3 a vertical section of the upper part of the machine extending down to the mold which is indicated in dotted lines in the position which it occupies when molding is effected; Fig. 4 a vertical section of the middle part from the core which is indicated in dotted lines down to the joint of the toggle arms; Fig. 5 an elevation partly in section of the lower part down from the joint of the toggle arms; Fig. 6 a plan partly in section taken on the line 6 of Fig. 1.

On a suitable base frame A is journaled a main shaft $A'$ driven from a convenient motor. On this shaft is a pinion $A^2$ gearing with a wheel $A^3$ on a countershaft $A^4$. A crank pin $A^5$ on the wheel $A^3$ which is indicated only by a dotted circle is linked by a connecting rod $A^6$ to the middle joint connecting a lower toggle arm $A^7$ with a pair of upper toggle arms $A^8$ which are jointed to a crosshead B. From the base frame A extend upward two vertical bolts $B'$ $B'$ to a head $B^2$, to which they are secured. These bolts $B'$ $B'$ form guides for the crosshead B which is counterbalanced by weights W and by the action of the crank $A^5$, connecting rod $A^6$, and toggles $A^7$ and $A^8$ is caused to slide up and down once in every revolution of the wheel $A^3$. From a pulley $A^8$ on the shaft $A'$ a band extends up to a pulley $B^3$ on a shaft $B^4$ which is journaled on the head $B^2$. Also in the head $B^2$ is journaled a vertical spindle $B^5$ on which is fixed a worm wheel $B^6$ gearing with a worm on the shaft $B^4$, so that as the driving shaft $A'$ continuously revolves the spindle $B^5$ also continuously and slowly revolves. This spindle passes down through a sleeve $B^7$ fixed to the head $B^2$ and consisting of an inner and outer shell with an annular space between them which is supplied with steam. On the end of the spindle $B^5$ is fixed the core C which has the form of the interior of the flower pot to be molded. Within this core is an inner cylindrical core $C'$ and within it a punch $C^2$ which is urged down by a spring and which, having studs projecting laterally into slots in the cylinder $C'$ when it is pushed down by the spring carries the cylinder $C'$ down with it as far as permitted by studs projecting laterally from the upper part of $C'$ into slots in the interior of C. Thus when the mold, indicated by the dotted lines D (Fig. 3) is away the cylinder $C'$ projects beyond the end of the core C and the punch $C^2$ projects still farther, both these parts being pushed up in opposition to the spring to the position shown in Fig. 3 when the mold D with the clay in it is forced up to the core C. The punch $C^2$ squeezing aside the clay under it, forms the hole at the bottom of the flower pot. In cases where a pot or jar, or a dish, saucer or the like has to be molded without a hole through it, there are no slots in the cylinder $C'$ giving play to the lateral studs of the punch $C^2$, but these studs enter holes in $C'$ in such position that the point of the punch $C^2$ is kept always level with, so as to form part of the end of the cylinder $C'$.

The double sleeve $B^7$ is inclosed within an outer sliding sleeve $C^3$ which is urged down by several springs (of which one is shown at $C^4$) as far as is permitted by adjustable nuts $C^5$ meeting the flange of $C^3$ and forming stops for it. The lower end of the sleeve $C^3$ is so shaped as to round the lip of the molded flower pot. Just above the lower end of $C^3$ there are several holes through it for escape of such surplus clay as may be forced out of the mold.

The mold D, which is fixed in the crosshead B has an outer shell $D'$ partly inclosing it with a space between it and the mold, which is supplied with steam by a pipe flexible or jointed to allow of the up and down movements of the crosshead and mold. The bottom of the mold is formed as a valve $D^2$ seating on an inclined interior shoulder of the mold. The stem $D^3$ of the valve $D^2$ extends down through a guide $D^4$ attached to the crosshead B and passes through a block $E'$ in which it is free to turn as in a swivel but is held by collars so as not to slide. It has also fixed on it above the block $E'$ an arm $E^2$ held usually by a spring in the position shown in Fig. 6. On one of the toggle arms $A^8$ is mounted a spring pawl $E^3$ which has an inclined face presented toward $E^2$ these parts operating to partly turn the stem $D^3$ as will hereinafter be described. The block $E'$ has two side trunnions fitted in eyes of a lever E which is pivoted on a link $E^4$ hanging from the crosshead B. The lever E carries a counterweight $E^5$, for which a spring might be substituted, and the descent of its loaded end beyond a certain distance is checked by a chain $E^6$. On the lever E between the link $E^4$ and the block $E'$ is pivoted a trigger lever having three arms, an upright arm F the top of which bears against a shoulder of the guide $D^4$, an arm $F'$ drawn toward the right by a spring and a third arm $F^2$ the end of which extends a little beyond a roller $E^7$ which is mounted on the end of the lever E. On the base frame A is fixed a tappet roller G, and on the toggle arm $A^7$ is adjustably mounted a spring pawl $G'$ to come in the way of $F^2$ and $E'$ respectively.

The operation of the machine is as follows:—The crosshead B and mold D being in a low position, a lump of clay sufficient to form the pot, in the state of very stiff almost dry paste and preferably lubricated with crude oil, is placed in the mold. As the crosshead B ascends, the rounded edge of the arm $E^2$ meets the rounded back of the pawl $E^3$ the spring of which allows it to yield permitting $E^2$ to pass it upward. When the mold with the clay in it is near the top of its stroke, the clay first meets the punch $C^2$ and cylinder $C'$ and pushes them up to the position shown in Fig. 3, the clay being then squeezed up between the interior of the mold D and the exterior of the core C; also the upper edge of the squeezed up clay meets the lower end of the sleeve $C^3$ and forces it up in opposition to its springs, so molding the lip of the pot. The mold D being heated by the steam in its jacket and the core C being heated by conduction from the jacket sleeve $B^7$, and the core also slowly revolving, the lubricated clay becomes smoothly molded outside and inside without adhering to the mold or core, and when the mold begins to descend, the sleeve $C^3$ and the cylinder $C'$ are caused by their springs to descend aiding the withdrawal of the molded pot from off the core C. When the mold with the pot in it has descended a certain distance the face of the arm $E^2$ meets the inclined face of $E^3$ and thus the stem $D^3$ and valve bottom $D^2$ of the mold are turned partly round, and on $E^2$ passing $E^3$ are turned back by the spring acting on $E^2$, this turning movement of $D^2$ releasing the clay at the bottom of the pot. As the crosshead B farther descends the arm $F^2$ meets the pawl $G'$, thus withdrawing the trigger F from the shoulder against which it abutted, and, immediately thereafter, the roller on E also meets the pawl $G'$, the lever E being thus stopped and with it the block $E'$ and stem $D^3$. The bottom $D^2$ of the mold with the molded pot upon it remains stationary while the crosshead and mold continue their descent, and thus the molded pot is exposed clear above the mold and is removed by hand. By the still farther descent of the crosshead, the loaded arm of the lever E is brought against the tappet-roller G and thus the lever E, block $E'$, stem $D^3$ and mold bottom $D^2$ are all restored to the position shown in Fig. 1, the trigger F becoming again engaged against the shoulder; whereupon the molding operation is repeated as above described.

Having thus described the nature of my invention and the best means I know for carrying the same into practical effect, I claim—

1. In apparatus for molding clay or earthenware articles, a core fixed on a spindle slowly rotated by worm gear within a steam jacketed sleeve, inside the core a sliding bottom and punch urged by a spring down to stops, and outside the core a sliding sleeve urged by springs down to stops substantially as and for the purpose set forth.

2. In apparatus for molding clay or earthenware articles, a steam jacketed mold having a valve bottom with stem swiveled to a counter weighted lever, an arm on the stem with spring and a tappet pawl on a toggle arm for partly turning the stem, a spring trigger on the lever holding the stem down, an adjustable tappet on base to meet the lever and lower the stem, and an adjustable tappet pawl on toggle arm to meet the trigger and lever and raise the stem, substantially as and for the purpose set forth.

3. In apparatus for molding clay or earthenware articles, the combination of a frame carrying in its upper part a core presented downward, a vertically guided crosshead which holds a mold presenting its mouth upward and which is jointed to toggle arms linked by a connecting rod to a revolving crank substantially as described.

In testimony whereof I have signed my name to this specification, in the presence of two subscribing witnesses, this 23d day of February, A. D. 1893.

WILLIAM WEST.

Witnesses:
 HENRY S. LENTY,
 GEO. PARISH,
*Clerks to T. & H. Greenwood Teale, Sols. and Notaries Public, Leeds, England.*